United States Patent
Hennessy et al.

(10) Patent No.: US 12,273,336 B2
(45) Date of Patent: Apr. 8, 2025

(54) PRIVACY-PRESERVING VIRTUAL EMAIL SYSTEM

(71) Applicant: Google LLC, Mountain View, CA (US)

(72) Inventors: Karin Hennessy, Brooklyn, NY (US); Jeremy Joshua Phillips, New York, NY (US)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 17/795,918

(22) PCT Filed: Dec. 2, 2021

(86) PCT No.: PCT/US2021/061525
§ 371 (c)(1),
(2) Date: Jul. 28, 2022

(87) PCT Pub. No.: WO2022/119999
PCT Pub. Date: Jun. 9, 2022

(65) Prior Publication Data
US 2023/0074364 A1    Mar. 9, 2023

Related U.S. Application Data

(60) Provisional application No. 63/121,087, filed on Dec. 3, 2020.

(51) Int. Cl.
*H04L 9/40* (2022.01)

(52) U.S. Cl.
CPC ........ *H04L 63/083* (2013.01); *H04L 63/0421* (2013.01)

(58) Field of Classification Search
CPC ... H04L 63/083; H04L 63/0421; H04L 51/48; H04L 63/1483; H04L 63/08; G06F 21/31;
(Continued)

(56) References Cited

U.S. PATENT DOCUMENTS 9,582,802 B2 * 2/2017 Bachenheimer ..... G06Q 10/107
10,511,493 B1 * 12/2019 McCown .............. H04L 67/564
(Continued)

FOREIGN PATENT DOCUMENTS

| KR | 10-2012-0004891 | 1/2012 |
| KR | 10-2019-0001875 | 1/2019 |
| WO | WO 2016/007763 | 1/2016 |

OTHER PUBLICATIONS

International Preliminary Report on Patentability in International Appln. No. PCT/US2021/061525, mailed on Jun. 15, 2023, 7 pages.
(Continued)

*Primary Examiner* — Anh Nguyen
(74) *Attorney, Agent, or Firm* — Fish & Richardson P.C.

(57) ABSTRACT

Methods, systems, and apparatus, including computer programs encoded on a computer storage medium, for creating and using virtual email addresses for user privacy protection and data security are described. In one aspect, a method includes receiving, from a user device and at an identity server, login credentials for a first email address mapped to a first set of user information values, detecting, by the identity server, a trigger event, in response to detecting the trigger event, creating, by the identity server, a new virtual email address separate from the first email address and mapped to a second set of user information values different from the first set of user information values, detecting, by the identity server, a request for credentials from a requesting entity, and in response to detecting the request, transmitting, by the identity server, the new virtual email address as new login credentials to the requesting entity.

20 Claims, 5 Drawing Sheets

(58) Field of Classification Search
CPC .. G06F 21/62; G06Q 10/107; G06Q 20/3821; G06Q 20/385; G06Q 10/10; G06Q 20/38
See application file for complete search history.

(56) References Cited

U.S. PATENT DOCUMENTS

| | | | |
|---|---|---|---|
| 10,698,701 | B1 | 6/2020 | Jong et al. |
| 2002/0138581 | A1 | 9/2002 | MacIntosh et al. |
| 2010/0198928 | A1* | 8/2010 | Almeida ............... H04L 51/212 709/206 |
| 2012/0317222 | A1* | 12/2012 | Almeida ............. G06Q 10/107 709/206 |
| 2020/0067869 | A1 | 2/2020 | Jouan |
| 2020/0120047 | A1* | 4/2020 | Adams .................. H04L 67/561 |
| 2021/0097534 | A1* | 4/2021 | Kurian .................. G06Q 20/10 |

OTHER PUBLICATIONS

Gabber et al., "How to make personalized web browsing simple, secure, and anonymous." International Conference on Financial Cryptography. Springer, Berlin, Heidelberg, Feb. 1997, 17-31.
International Search Report and Written Opinion in International Appln. No. PCT/US2021/061,525, dated Feb. 24, 2022, 12 pages.
Office Action in Japanese Appln. No. 2022-543559, mailed on Sep. 11, 2023, 6 pages (with English translation).
Notice of Allowance in European Appln. No. 21836674.8, dated Mar. 1, 2023, 8 pages.
Notice of Allowance in Japanese Appln. No. 2022-543559, mailed on Nov. 20, 2023, 5 pages (with English translation).
Office Action in Korean Appln. No. 10-2022-7023818, mailed on Feb. 15, 2024, 13 pages (with English translation).
Notice of Allowance in Korean Appln. No. 10-2022-7023818, mailed on Oct. 17, 2024, 4 pages (with English translation).
Office Action in Indian Appln. No. 202227035330, mailed on Feb. 7, 2025, 6 pages (with English translation).

* cited by examiner

PRIVACY-PRESERVING VIRTUAL EMAIL SYSTEM

CROSS-REFERENCE TO RELATED APPLICATION

This application is a National Stage Application under 35 U.S.C. § 371 and claims the benefit of International Application No. PCT/US2021/061525, filed Dec. 2, 2021, which claims priority to U.S. Application No. 63/121,087, filed Dec. 3, 2020, entitled PRIVACY-PRESERVING VIRTUAL EMAIL SYSTEM. The disclosures of the foregoing applications are incorporated herein by reference.

BACKGROUND

This specification relates to data processing and email addresses that are linked to user information and can be used as an identifier for authentication and/or authorization purposes.

Email addresses provide a way for users to communicate over the Internet. Typically, a user has one or more email addresses that they use for various purposes. For example, a user may have a work email address that they use to communicate with work colleagues, and the user may have a personal email address that they use to communicate with friends outside of work.

SUMMARY

In general, one innovative aspect of the subject matter described in this specification can be embodied in methods that include receiving, from a user device and at an identity server, login credentials for a first email address mapped to a first set of user information values, detecting, by the identity server, a trigger event, in response to detecting the trigger event, creating, by the identity server, a new virtual email address separate from the first email address and mapped to a second set of user information values different from the first set of user information values, detecting, by the identity server, a request for credentials from a requesting entity, and in response to detecting the request, transmitting, by the identity server, the new virtual email address as new login credentials to the requesting entity.

These and other implementations can each optionally include one or more of the following features. In some implementations, the trigger event is one of a user input and a predetermined condition defined by the identity server.

In some implementations, the login credentials are provided in the form of text input, audio input, or visual input.

In some implementations, transmitting the new virtual email address as login credentials to the requesting entity includes transmitting, through a tokenization application programming interface, data representing the new virtual email address through a tokenization API, where the data representing the new virtual email address is a token that cannot be traced to the first email address.

In some implementations, the method includes updating, by the identity server and based on the new virtual email address, a database by creating a database entry mapping the new virtual email address to the second set of user information values. In some implementations, the method further includes receiving, from the user device, input that indicates a change to the new virtual email address, and updating, by the identity server and based on the input that indicates a change to the new virtual email address, the database entry.

In some implementations, the request for credentials includes data indicating that the user device has accessed a webpage having one or more text fields for entering credentials.

Other embodiments of this aspect include corresponding systems, apparatus, and computer programs, configured to perform the actions of the methods, encoded on computer storage devices.

A user generally has one main email address that they use for many purposes, including receiving email and as an identifier to create an account with a third party, among other purposes. There is increasing interest in using email addresses as identifiers because of the convenience to users. By allowing the use of an email address as an identifier for authentication and/or authorization purposes, a user can simply enter their email address to grant an application, content provider, or other entity with access to any requested user information.

However, because a user will typically use a single main email address over the course of many years, this main email address may be associated with a wealth of information specific to the user, accumulated over the entire course of the time that the user has owned the mail email address. A user may not want to grant a requesting entity access to the full set of information that is associated with their main email address. Requesting entities can include, for example, content providers or government organizations. Furthermore, a user may want to create a temporary identity when asked, and may not want their activity to be stored and accessible. For example, someone who is using a shared computer to plan a surprise trip during which they will propose to their significant other may not want their recent travel planning activity to be accessible by their significant other. In this situation, the use of email addresses as temporary identifiers rather than other types of identifiers (e.g., third-party cookies), can help prevent the leakage of data or other information to unintended parties.

The following description discusses various techniques and systems for preserving the privacy of users as they navigate the internet or use native applications on their devices, while still enabling a personalized experience, which results in a more efficient system by reducing the number of network requests users have to make (which reduces the computing resources required, server accesses required, data transfer required, and user device battery resources consumed) in order to arrive at the online information they are seeking.

A virtual email system allows users to create and manage virtual email addresses for use as identifiers in place of cookies. Virtual email addresses can be used as a way to maintain identity that is convenient for users and provides them with a degree of control over what data is being collected, how it is being collected, and how it is being used. By using virtual email address identifiers that are separated from a main identity of a user by layers of protection and allowing the user to control the information associated with a particular virtual email identifier, the described system provides users with a convenient solution that preserves or even improves the privacy available to them and allows requesting entities to access user information to which users have granted access. Users can create a new virtual email address and adjust privacy settings at any time. The described system allows users to control the data that is collected and the length of time for which the data can be maintained on a granular basis. For example, the described system allows users to create virtual email addresses of various levels of security, privacy, and protection, thereby improving data security.

The described system can automatically detect situations in which a new virtual email address should be generated, providing a seamless experience for users that provides them with control over how and when their data can be used without requiring the users to manually implement the measures each and every time that the user may want a new virtual email address.

The virtual email addresses can then be provided to a secure API that performs, for example, tokenization of the virtual email address identifier to provide a layer of protection between the virtual email address and the requesting entity. The token can then be used for identification, authorization, and/or authentication purposes.

Particular embodiments of the subject matter described in this specification can be implemented to realize one or more of the following advantages. For example, using tokenization techniques to secure user data prevents user information available to the entities that participate in the process from being leaked to other entities. Additionally, by implementing other layers of protection, including encryption, the structure of the virtual email management system prevents entities from accessing any more information than is necessary for authentication or authorization. For example, the virtual email system can maintain separation between the virtual email addresses such that the main email address is not accessible to entities to whom access to a virtual email address mapped to the main email address is granted. The techniques discussed throughout this document also enable personalized content selection, internet browsing, and application usage, among other activities, to be performed while preventing any of the systems involved the content delivery or requesting entities from being able to track an individual user across different websites, data integration platforms, time periods, etc.

The techniques discussed herein include transmitting data for the purposes of authentication and/or authorization using coded data or tokens in place of actual data such that the computing systems that participate in the processes discussed herein do not have access to the underlying data, but can still perform the operations of the processes using these codes. Using codes in place of actual data also protects the data even if the data is compromised, e.g., stolen or leaked to another entity, thereby improving data security.

The system also automatically generates virtual email addresses for a user based on triggering events, reducing the amount of input required from a user and reducing the latency in content presentation. By automatically generating a virtual email address, the system reduces the necessary central processing unit (CPU) cycles required to perform the process, e.g., by not having to encrypt and decrypt large amounts of input from a user, reduces the latency in performing the process which is critical for implementations in which the process is used to select content for presentation on user devices, and makes the overall process more efficient. Furthermore, data can be cached locally at particular computing systems such that latency is reduced for future requests of any cached data. Reducing latency also reduces the number of errors that occur at user devices while waiting for such content to arrive. As the content often needs to be provided in milliseconds and to mobile devices connected by wireless networks, reducing the latency in selecting and providing the content based on user information is critical in preventing errors and reducing user frustration. By automatically generating a virtual email address and then using the email address for authentication and/or authorization, the system provides a seamless experience for users.

The described techniques also provide a simplified process for maintaining a high level of privacy. By implementing a unified management system for various user identifiers mapped to a single, main email address of a user, the system provides a high standard for user privacy without requiring extensive changes in input required from users or authentication and/or authorization processes of requesting entities.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The description that follows is related to providing user control over email address identifier generation and management. Because a user will typically keep the same main email address over a long period of time and usually does not delete that email address, it is usually linked to a lot of user information gathered over the period of time. Additionally, main email addresses can be used as credentials for logging into applications or websites, and a user may use the main email address as a credential for logging into many of their accounts or for accessing other data.

A user may not want to provide every requesting entity, such as a website, a vendor, a content provider, etc. with all of the data linked to their main email address, or allow such entities to collect user data over time based on their main email address. However, creating a new email address to use as credentials for each new requesting entity and managing the information can be tedious, time-consuming, and utilize more computing resources than automated techniques for generating and using multiple email addresses.

To solve this problem, the described system generates virtual email addresses to be used as identifiers, e.g., in situations in which a user may want to limit the amount or type of information provided to a requester and/or the amount of time for which the requester has access to the information. The system can automatically detect events or conditions that trigger the creation of a virtual email address for a user and also allows users to manually initiate the creation of a new virtual email address. A user can also access the system through their user device, communicating with different applications, websites, and requesting entities through an application programming interface (API).

The virtual email addresses are provided to a database that stores user profile information. This profile information is organized within the database by email address. For example, the profile information can be indexed by email address. Once the virtual email address is linked to profile information within the database, the virtual email address can be used as an identifier or other credential for authentication and/or authorization purposes. As described in further detail below, the user can manage settings for an email address or delete the email address at any time.

Figure 1:
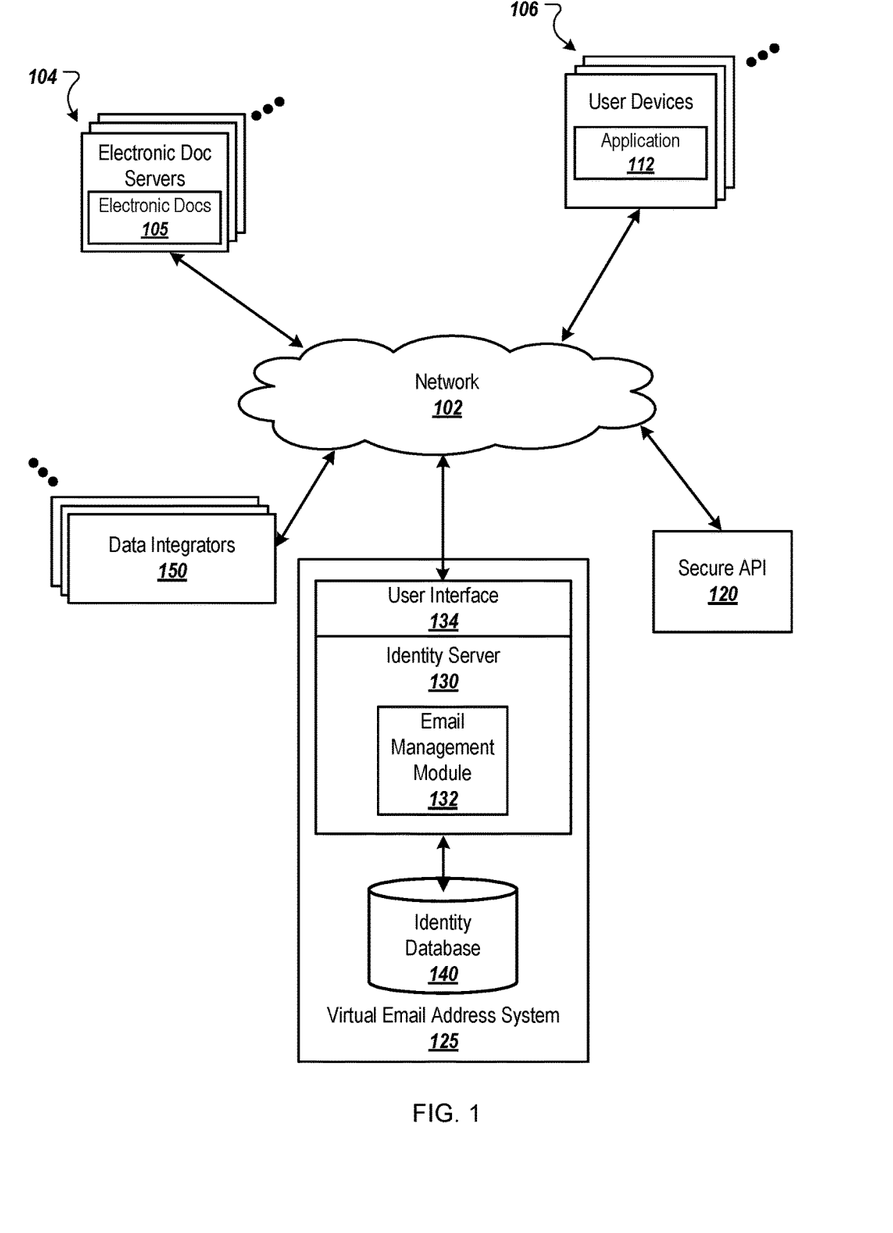
FIG. 1 is a block diagram of an example environment for a privacy-preserving virtual email address system.

FIG. 1 is a block diagram of an example environment 100 for a privacy-preserving virtual email address system 125. The example environment 100 includes a network 102, such as a local area network (LAN), a wide area network (WAN), the Internet, or a combination thereof. The network 102 connects electronic document servers 104 ("Electronic Doc Servers"), user devices 106, secure API 120, the virtual email address system 125 (which includes a privacy identity server 130 and identity database 140), and data integrators 150. The example environment 100 may include many different electronic document servers 104, user devices 106, and data integrators 150.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, gaming systems, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software such as a browser or an operating system. In some implementations, the software allows a user to access information through a network, such as network 102, retrieving information from a server and displaying the information on a display of user device 106. In some implementations, the software manages user device 106's hardware and software resources and provides common services for other programs on user device 106. The software can act as an intermediary between programs and the user device's hardware. In this particular example, an application 112 running on the user device 106 is software that allows a user to access information through network 102.

An electronic document is data that presents a set of content at a user device 106. Examples of electronic documents include webpages, word processing documents, portable document format (PDF) documents, images, videos, audio, search results pages, streaming video game content, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source. Media content as referred to herein is a type of digital content.

For each user, applications and content providers can maintain identification, authentication, and/or authorization information for each user accessing their data. Generally, this information is stored and sorted using a small piece of data stored on the user's device, known as a cookie. However, cookies are generally created and stored by each application creator or content provider and can be used to compile records of an individual's historical activity without input from the user regarding the type or amount of information that can be collected, the amount of time that the information can be retained, or with whom the information can be shared. Additionally, the security of a cookie generally depends on the security of the issuing website, which can vary. These properties of cookies can provide privacy and security risks to users.

Secure API 120 facilitates the transmission of sensitive data to third party that replaces the received data with non-sensitive placeholders. For example, secure API 120 can perform tokenization to replace received data with tokens. Secure API 120 can be used to secure and desensitize data by replacing received data with an unrelated value. The unrelated value can be, for example, of the same size and format. The tokens can retain elements of the original data and are then provided for use in authentication or authorization processes, and the original data is stored in a secure token vault. Tokenized data provides advantages over other forms of protection because tokenized data is undecipherable and irreversible. Since there is no mathematical relationship between the token and the original received data, tokens cannot be returned to their original form.

Identity server 130 is a server that allows for the creation and management of email addresses. In some implementations, identity server 130 can be used to create and manage both virtual and actual email addresses. Identity server 130 includes an email management module 132 and a user interface 134. Identity server 130 can be implemented as one or more processors. In some implementations, identity server 130 can be a single server. Identity server 130 can also be implemented as a distributed system, whose components are located at different networked computers.

Email management module 132 implements an email management module that generates, e.g., at a particular time, a virtual email address. For example, email management module 132 can detect events that trigger the generation of a virtual email. These events, also referred to as trigger events, can be specified by the user, the identity server 130, and/or the requesting entity, among other entities. For example, email management module 132 can detect that the current user has navigated to a website they have never accessed before, and that the website is requesting credentials. Email management module 132 can then determine that the accessing of a website that has not previously been accessed by the user and the requesting of credentials is a trigger event specified by the identity server 130 and generate a new virtual email address linked to the user's main email address. This new virtual email address can be provided to the new website, e.g., rather than an existing email address for the user.

Email management module 132 can generate or modify a virtual email address with particular parameters. For example, email management module 132 can generate a virtual email address with a specific level of privacy protection, with a specific set of user information, and linked to the user's main email address. In some implementations, there can be multiple layers of email addresses between a particular virtual email address and the user's main email address. The structure in which the email addresses linked with a user's main email address are stored can be, for example, in the form of a tree structure. The tree structure and the connections between each email address are described in detail below with respect to FIG. 3.

User interface 134 of identity server 130 allows a user to provide input to email management module 132. For example, user interface 134 allows a user to perform operations such as initiate the generation of a new virtual email address, input creation parameters for the new virtual email address, make changes to parameters of existing email addresses, and delete existing email addresses, among other operations. The identity server 130 can provide the user interface 134 to client devices 106 and/or update the user interface 134 at the user devices 106. For example, the identity server 130 can provide data that causes the user device 106 to generate the user interface and display data to a user of the user device 106.

Identity database 140 stores user information using a personal identifier for the user. For example, identity database 140 can be an email-based information storage system, where the information is user information linked to a particular email address. In this example, the personal identifier is the particular email address. This information can include metrics determined based on data that the user of the particular email address has provided a requesting entity with the authorization to collect. For example, the information can include a user's location information and the average amount of time that the user has spent visiting a particular coffee shop last month.

Data integrator 150 combines data from different sources and provides users with a unified view of the data that can be more informative or useful than the original presentation of the data. Data integrator 150 consolidates data of different types and allows users to perform actions such as querying or analyzing the data. Within the system 100, data integrator 150 receives and processes the data for use by another user, such as a requesting entity.

Figure 2:
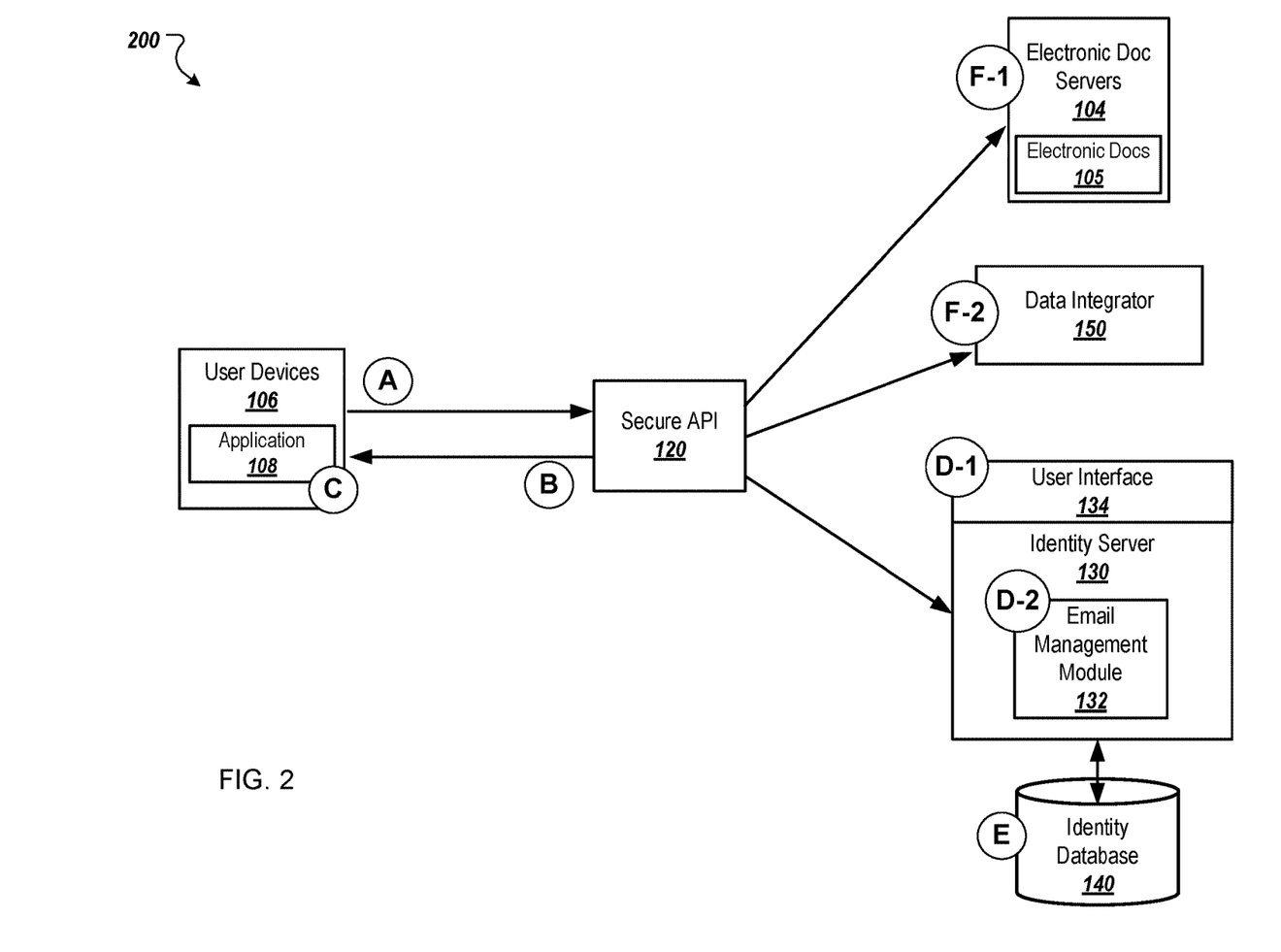
FIG. 2 depicts a data flow of a process for generating a virtual email address.

FIG. 2 depicts a data flow 200 of a process for generating a virtual email address in the example environment of FIG. 1. Operations of data flow 200 are performed by various components of the system 100. For example, operations of data flow 200 can be performed by user device 106 in communication with identity server 130 through secure API 120.

The flow begins with step A, in which a user logs into their main email address. For example, the user can log into ExampleEmailAddress@exampledomain.com, the user's main email address. The user can log into their email address through user device 106. For example, the user can log into their email address using an email client on user device 106. In some implementations, the user can log into their email address through an application 112. Application 112 can be an internet browser integrated with an email client, and application 112 can be, for example, a web browser through which the user can access a web-based email client.

The flow continues with step B, in which the user can log into an application that facilitates internet browsing through an authorization standard. For example, the user can log into application 112 through an authorization standard such as oAuth, an open authorization standard. The standard allows a user to log into a third party application, website, or other destination using an email address. For example, the user can log into application 112, a web browser, using their main email address ExampleEmailAddress@exampledomain.com. The authorization standard can use, for example, secure API 120 to perform a token exchange.

The flow continues with step C, in which the user can use the application that facilitates internet browsing to browse websites and other destinations and use their main email address to identify themselves to their browsing destinations. For example, the user can use application 112 to browse the internet and use their main email address ExampleEmailAddress@exampledomain.com to identify themselves to the website they are currently visiting, Cute Bird News Example Website.

The flow continues with step D, in which a new virtual email address is generated for the user. A virtual email address can be created as described with respect to step D-1, in which the user manually initiates the generation of the new virtual email address, or step D-2, in which the identify server 130 automatically initiates the generation of the new virtual address.

In step D-1, the user can initiate the generation of a unique email address and specify parameters of the email address. For example, a user can click a button, icon, or other control within user interface 134 and enter "NewsWebsitesEmailAddress" as a new local-part into a text field, "News Websites" as its purpose into another text field, and select their name and location from a list of selectable items as information that requesting entities for which the virtual email address is used as an identifier can access. In this way, the user can control which virtual email address is used for various different purposes. User interface 134 provides an email generation and management UI that allows a user to edit their information and indicate what data they want shared with requesting entities. A user can obliterate or change their email address and attributes through user interface 134 at any time.

For example, user interface 134 allows a user to create, edit, and delete email address. User interface 134 can provide users with an organized view, for example, of their email addresses sorted according to particular attributes of the email addresses. User interface 134 provides filtering and sorting options that allow a user to view a subset of their email addresses. In some implementations, user interface 134 can present the user with a tree-view of their email addresses. This structure is described in detail below with respect to FIG. 3.

In some implementations, a randomized local-part for the new virtual email address can be selected for the user and presented for approval. In some implementations, the user can create their own local-part different from the local-part of their main email address. The new virtual email address can be hosted by the same domain as the main email address. In some implementations, the new virtual email address is hosted by a domain different from the domain hosting the main email address.

User interface 134 allows a user to select a view they would like to use to display their email address management interface. For example, user interface 134 can provide a user with options of how user interface 134 presents the email address management interface element. A user can toggle between various email addresses and specify preferences and parameters for the email addresses through user interface 134. User interface 134 allows a user to edit one or more email addresses at the same time.

A user can access user interface 134 manually by selecting a shortcut or launching identity server 130. For example, a user can select user interface 134 from their desktop on user device 106. A user can access user interface 134 through various other methods for launching or accessing an application, including through audio input, gestures, touch input, etc. For example, a user can speak a trigger word to a personal assistant device to launch user interface 134.

In some implementations, user interface 134 can be triggered for display to the user. User interface 134 can be triggered for display based on a particular trigger event specified by the user, identity server 130, and/or data integrator 150, etc. For example, user interface 134 can be triggered for display to the user when the user accesses a shopping website that requests credentials from the user. The user can access any of the creation and management functions provided by identity server 130 through user interface 134 whenever it is presented. In some implementations, a particular view of user interface 134 is presented for a particular trigger event. For example, a specific, abbreviated list of actions including navigating away and locking all email addresses and user information from being accessed can be provided to the user when they access a website on a blacklist of websites maintained by identity server 130. In another example, a list of virtual email addresses that can be used for a website can be presented when the user accesses a non-blacklist website. In this way, the user can select one of the email addresses to provide to the website in an easy and efficient manner.

In some implementations, user interface 134 can display the user information stored and linked to a particular email address. User interface 134 can also display a history of the use of the particular email address as an identifier. For example, user interface 134 can display the websites, destinations, and other requesting entities that have access to a particular email address as an identity for the user.

In step D-2, in which an email management module, e.g. email management module 132, can automatically create a new virtual email address having particular attributes for the user. The email management module 132 can implement various default trigger events or conditions for creating a new virtual email address. For example, the email management module 132 can create default trigger conditions to create a new virtual email address for one-time use, one-website use, one-data integrator use, etc. The email management module 132 can also specify when a virtual email address, including any associated user data, should be deleted. For example, if an email address is created for one-time use, the email management module 132 can specify that the email address should be deleted immediately after use. The email management module 132 can specify a triggering event, a time, a condition, etc. that initiates deletion of an email address. The email management module 132 can also edit settings and attributes of an email address. For example, the email management module 132 can update an email address to reduce access to user information or to remove user information.

In some implementations, the email management module can use a temporary email address that does not ever collect, store, or provide user data. This type of temporary email address can be used in situations in which it is not safe or not desired for information be gathered or exchanged. In this example, no user information of the user may be associated with this temporary email address.

The email management module improves a user's experience by automatically detecting opportunities and situations in which a new virtual email address can, or should, be used as an identifier for the user. In addition to offering a seamless and simple user experience, identity server 130 and user interface 134 allow a user to exercise control over the automatically created email addresses by offering users the choice to continue with a newly created email address, to edit attributes of one or more email address, etc.

The email management module uses signals about the user and their activities and destinations to determine trigger events. The trigger events can be predetermined or detected upon occurrence. For example, the email management module can determine, based on a user's history of initiating the creation of a new virtual email address each time they use the search terms "best" "surprise" "vacation" "locations" and deleting the virtual email address after the session, that a new virtual email address should be created each time the user inputs this combination of search terms and that the new virtual email address should be deleted after the session is ended. In another example, the email management module can determine, based on the user's activity which included going to various jewelry store websites and clicking on different types of engagement rings. The email creation can then create a new virtual email address to be used whenever the user is detected to be visiting jewelry store websites so that this type of activity is linked only to the virtual email address created specifically for this purpose.

The email management module can trigger display of user interface 134 to the user to display the new virtual email address and its parameters to the user for approval or for the user's information upon the creation of the new virtual email address. For example, the email management module can create a new virtual email address when identity server 130 detects that the user has input the search terms "best" "surprise" "vacation" "locations" through application 112, a web browser, and trigger display of user interface 134 including the virtual email address that was newly created and its parameters. The user can then approve of the creation and continue using the newly created email address, dismiss user interface 134 to proceed with an existing default email address for the trigger situation, select a different email address to use, navigate away from the search, etc.

The trigger event can be time based. For example, the email management module can designate a trigger event to delete email addresses having a particular set of attributes every week. The trigger condition can be accessing a particular website or destination. For example, the email management module can designate a trigger event to create a new virtual email address when accessing a website for the Shopping For Cute Bird Stuff Store if one is not already mapped to the website. The trigger event can be the closing of a browsing session. For example, the email management module can designate a trigger event to create a new virtual email address when opening a new browsing session and to delete the current email address when closing the browsing session. The trigger event can be launching a particular application. For example, the email management module can designate a trigger event to create a new virtual email address when launching a web browsing application different from the web browsing application 112 through which the user logged into their main email address in step 1. The trigger condition can be based on characteristics of the user device 106. For example, the email management module can designate a trigger event to create a new virtual email address when the user has logged in using a user device 106 they do not usually use, or have never used.

A time-based trigger event can be used to recycle and/or renew email addresses at a specified frequency. That is, an email address can be removed from usage for and returned to service according to a specified frequency. This can limit the probability that an entity could determine the identity of a user using a combination of an email address attribute and other user identifying information, such as cookies associated with the user or a user group identifier that identifies a user interest group that includes the user as a member.

In some implementations, the frequency at which an email address is recycled can be determined and/or adjusted based on information related to the user. For example, the frequency can be based on a measure of online activity of the user (e.g., how often or how much time the user spends online), a quantity of third-party content provided to the users, the number of databases that include information about the user, etc. For example, the email addresses for a more active user may be recycled more often than the email addresses for a less active user as it's more likely that a larger number of entities have access to the email addresses and other information related to the more active user than the less active user. Thus, absent the more frequent recycling, the entities would have a better chance at learning the identity of the more active user than the less active user.

Email addresses can also be renewed after being used for a user. For example, the user can select to user a particular email address when accessing a particular website. In response, the email management module can prevent usage of the email address for a specified duration and then renew the email address for further usage by the user after the duration expires. The email management module can be integrated with databases of requesting entities to detect when email addresses are used and recorded. Or, the user can provide, to the email management module, data indicating that a particular email address was used, e.g., using the user interface 134. In another example, the user interface 134 can report, to the email management module, when the user selects a particular email address to use for a requesting entity.

In some implementations, multiple users can share an email address. Each user can have a sub-account within that email address. This can protect individual user privacy by not being able to link the email address to the particular user that is accessing a website using the shared email address.

Multiple users can be grouped into, e.g., assigned to, an email address based on a category of interest for the email address and user information that indicates that the users are interested in the category of interest. For example, the online activity of a user can be analyzed, e.g., at the user device of the user using a privacy secure technique, to determine one or more categories of interest for the user. The email management module can receive, from the user device of the user, the one or more categories of interest for the user and compare these categories of interest to the categories of interest of various email addresses. If there is a match, the email management module can assign the email address to the user and include the email address in a list of email addresses that the user can use when accessing websites.

For example, each user that is determined to be interested in puppies can be assigned to an email address "puppies@example.com." Each of these users can then access websites and/or other electronic resources using this email address. In this way, the websites would not be able to identify the individual users, but would be able to customize content to the users, e.g., by providing puppy related content or other content that users interested in puppies are also interested in.

In some implementations, the email management module can maintain a list of websites for which trigger events are defined. For example, the email management module can maintain a blacklist of websites for which creating a new virtual email address with no user information accessible is recommended. In some implementations, the email management module can generate a score for each website based on attributes such as a category of content provided, third party-generated trust scores, the number of visitors over a period of time, the trustworthiness of visitors, etc. For example, the email management module can implement a scoring mechanism on a scale of 0-100, with 100 being the most trustworthy. In this example, the email management module can assign a score of 10 to a website from which users frequently order items but have posted complaints that they do not receive the items and that they have begun to receive spam emails to the email address they used as credentials for the website. A user visit to a website having a score that satisfies a threshold, e.g., by being less than or equal to the threshold, can be a trigger event.

In some implementations, the email management module can be triggered by other input or events, such as defined audio input from the user. For example, if the user claps to switch to a different email address identity or to create a new virtual email address. The trigger event can include visual input form the user when the user has granted access to a camera of their device and/or defined the gesture as a trigger event. For example, if the user blinks twice rapidly, or executes a special gesture such as waving in a specific way, the email management module can detect these gestures, and trigger generation of a new virtual email address.

In some implementations, the email management module for a gamer user can create a new virtual email address for each game to preserve anonymity in an online setting. For example, a user can use an email address as an identifier to log into a streaming game platform. The email management module can create a different virtual email address for each type of game that the user is playing (e.g., role-playing game (RPG), puzzle games, strategy games, etc.).

Figure 3:
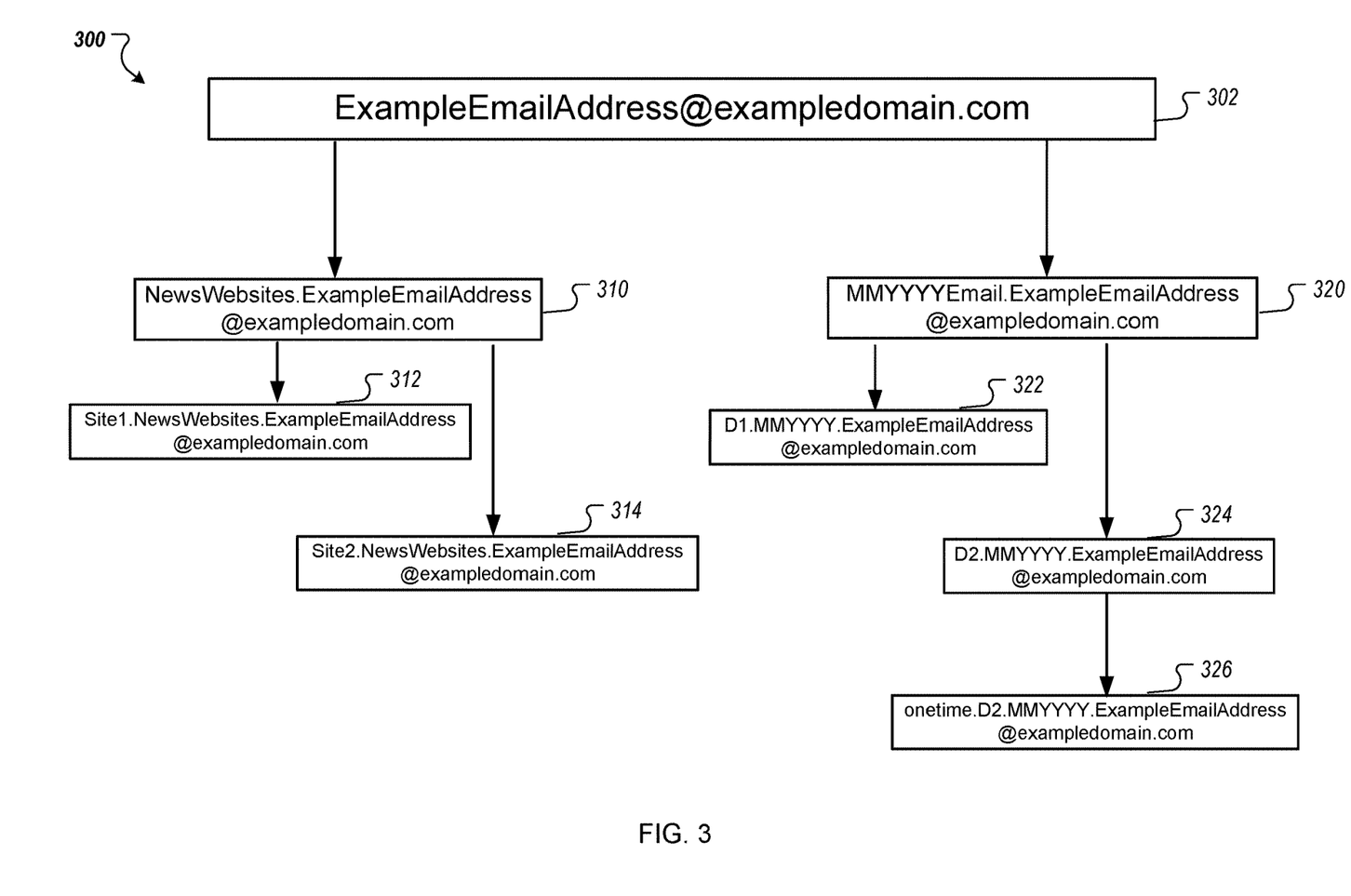
FIG. 3 depicts a tree structure for email addresses generated and managed by the virtual email address system.

Because the user's main email address and all linked virtual email addresses are shielded from third party requesting entities but visible to the identity server 130, the identity server 130 can use the stored structure, as described in detail with respect to FIG. 3, to defend against malicious or fraudulent activity perpetrated by the user under the guise of an outwardly anonymized email address that is a virtual email address created by the system.

Additionally, the system provides a user with flexibility, allowing the user to access resources anonymously. For example, a user can create separate email accounts to send emails. The user can have one email account for sending personal emails and one email account for sending emails to work colleagues and for applying to jobs. Because some email accounts may have different settings and restrictions, such as a limit on the number of daily emails, the user has more flexibility by having different email accounts, because the number of personal emails sent would not affect the number of work emails that the user can send.

In some implementations, the email management module 132 uses machine learning to analyze aggregate behavior of users of identity server 130. For example, the email management module 132 can determine that users of identity server 130 generally will create a new virtual email address upon the first visit to certain types of websites, such as blogs, and will reuse the same virtual email address for subsequent visits and for similar websites. In another example, the email management module 132 can determine that the average user deletes all virtual email addresses every month while preserving their main email address. The email management module 132 uses these learned behaviors to designate trigger events and conditions.

The email management module can detect and analyze activity specific to an email address, parsing and categorizing interactions and actions performed with a particular email address as an identifier. For example, the email management module can initiate the update of user information to update their location when the user is logged into their main email address and accessing a travel website that suggests popular activities in the vicinity.

In some implementations, the user can specify, through user interface 134, a set of automatic actions that identity server 130 should perform upon detecting a trigger event. For example, the user can provide input through user interface 134 indicating that a new virtual email address should be created every day and automatically used for identification, authentication, and/or authorization purposes during that day when a requesting entity requests credentials or information from the user. The user can also specify that the new virtual email address should be deleted at the end of the day.

The flow continues with step E, in which identity server 130 provides the new email address identity to identity database 140. For example, identity server 130 can communicate the specified information or type of information that is made available to requesting entities through the user's new virtual email address identity to identity database 140.

Identity database 140 stores this user information in user profiles organized by email address. The user of user device 106 can access, edit, and/or delete information within identity database 140 through user interface 134. In some implementations, the user can directly access the data stored within identity database 140 through user interface 134. In other implementations, the user can perform operations through user interface 134 that cause identity server 130 to access, edit, and/or delete information within identity database 140.

The flow continues with step F, in which identity server 130 communicates the user's chosen email address identity and associated user information to a requesting entity. The email address identity can be communicated to a requesting entity such as a content provider as described with respect to step F-1 or a data integrator as described with respect to step F-2. The email address identity can be the new virtual email address identity created in step D or a different email address identity specified by the user.

In step F-1, identity server 130 communicates the user's chosen email address identity to the requesting entity through secure API 120. In this particular example, the requesting entity is an electronic doc server 104 that can, for example, be a content provider or content publisher. The requesting entity can be, for example, an online store that maintains a website through which users can create an account and shop for items.

In step F-2, identity server 130 communicates the user's chosen email address identity to the requesting entity through secure API 120. In this particular example, the requesting entity is a data integrator 150 that can consolidate and compile data and perform data analysis on the data.

By communicating the user's chosen email address identity to the requesting entity, identity server 130 can perform an authentication and/or authorization process to provide user information and/or credentials to the requesting entity.

For example, identity server 130 can communicate the specified information or type of information that was made available to the requesting entity through the user's email address identity to the requesting entity. The communication can be performed with an entity regardless of the platform and/or format used by the requesting entity through a secure system such as secure API 120. The communication can be performed with an entity regardless of the platform and/or format used by the requesting entity through secure API 120, which can perform a secure token exchange.

FIG. 3 depicts a tree structure 300 for email addresses generated and managed by a virtual email address system, e.g. the virtual email address system 125 of FIG. 1. Email addresses within tree structure 300 are email addresses belonging to the user of user device 106 of the system as described in FIGS. 1 and 2. Tree structure 300 can be stored, for example, within identity database 140.

Tree structure 300 is a structure that depicts the linkages and relationships between the user of user device's main email address and the virtual email addresses associated with the user's main email address.

Email address 302 is the user's main email address, ExampleEmailAddress@exampledomain.com. Email address 302 is the user's oldest email address, and is the top level email address from which the virtual email addresses are generated and to which the virtual email addresses are linked.

Email address 310 is a virtual email address created for news websites, NewsWebsites.ExampleEmailAddress@exampledomain.com. Email address 320 is a virtual email address for the month, MMYYYYEmail.ExampleEmailAddress@exampledomain.com. For example, email address 320 can be created and used for a particular month of a particular year. Email addresses 310 and 320 are second level email addresses that are directly linked to the main email address 302, and are on a lower level than the top level email address 302.

Email addresses 312 and 314 are virtual email addresses for particular news websites: Site1.NewsWebsites.ExampleEmailAddress@exampledomain.com and Site2.NewsWebsites.ExampleEmailAddress@exampledomain.com. Email addresses 322 and 324 are virtual email addresses for particular days: D1.MMYYYY.ExampleEmailAddress@exampledomain.com and D2.MMYYYY.ExampleEmailAddress@exampledomain.com. Email addresses 312, 314, 322, and 324 are third level email addresses that are linked to the main email address 302 through the second level email addresses 310 and 320, and are on a lower level than the second level email addresses 310 and 320.

Email address 326 is a virtual email address for one-time use for a particular day, ontime.D2.MMYYYY.ExampleEmailAddress@exampledomain.com. Email address 326 is a fourth level email address that is linked to the main email address 302 through the third level email address 324 and the second level email address 320.

In this particular example, email address 326 is the bottom level email address, and is on a lower level than the third level email addresses 312, 314, 322, and 324.

There are layers of protection and encryption between each level of email addresses. For example, although tree structure 300 clearly displays the linkages between each email address and between the levels of email addresses, and these relationships are maintained by the virtual email address system, the system only provides a requesting entity with the email address specified by the user, e.g., for that entity or for the purpose associated with the entity (e.g., news site purpose of the requesting entity is a news site). There may not be any mechanism for requesting parties who receive the user's email address through a tokenization process or exchange. This method of storing the email addresses preserves the privacy of users of the virtual email address system by preventing requesting entities such as corporate entities, government entities, or data integrators, etc. from tracing the email address identifier on any level other than the top level to the main email address 302.

By creating levels of email addresses that are each protected from each other, the virtual email address system severs the lower level email addresses from the top level, main email address 302. Each of the email addresses is protected from the other addresses such that the user data associated with each email address is not accessible to lower level email addresses. That is, the user data associated with email address 310, and email address 310 itself, would not be provided to requesting entities that would receive the email address 312 or email address 314.

When a user accesses, creates, edits, and/or deletes data in identity database 140 through user interface 134, identity server 130 can update the tree structure 300. A user can access emails within tree structure 300 on an individual basis or the user can access more than one email at a time. For example, a user can delete every bottom level email linked to their main email address on a regular basis.

In some implementations, the virtual email addresses can be recycled. For example, virtual email addresses that are deleted can be released back into a pool of available email addresses. As described above, the virtual email addresses can be recycled at a specified frequency, which can be dynamically adjusted.

Figure 4:
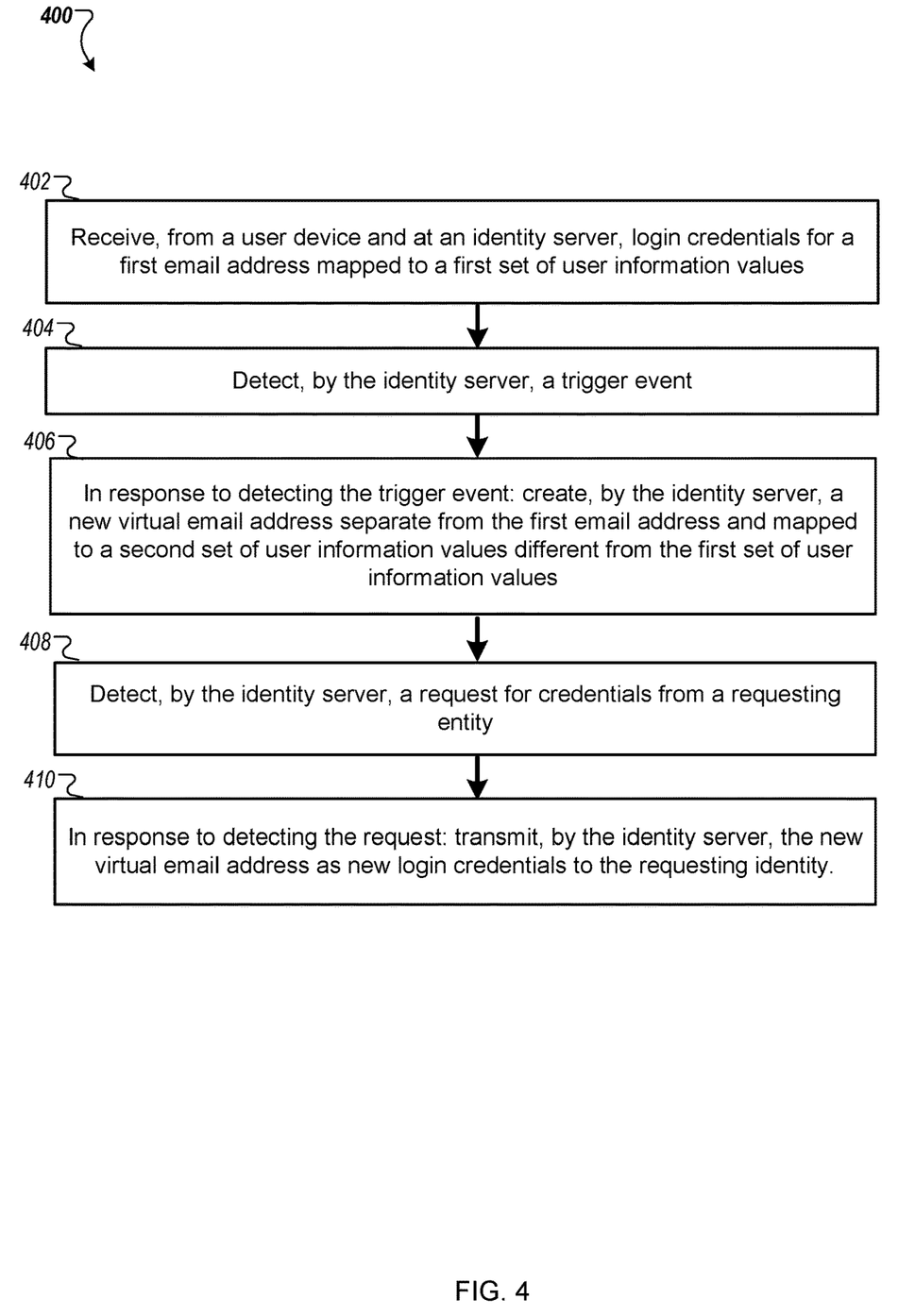
FIG. 4 is a flow diagram of an example process of generating a virtual email address.

FIG. 4 is a flow diagram of an example process 400 of generating a virtual email address. In some implementations, process 400 can be performed by one or more systems. For example, process 400 can be implemented by identity server 130 and/or user device(s) 106 of FIGS. 1-3. In some implementations, the process 400 can be implemented as instructions stored on a computer readable medium, which may be non-transitory, and when the instructions are executed by one or more servers, the instructions can cause the one or more servers to perform operations of the process 400.

Process 400 begins with receiving, from a user device and at an identity server, login credentials for a first email address mapped to a first set of user information values (402). For example, identity server 130 can receive, from user device 106, login credentials for a main email address that is mapped to a set of user profile information.

In some implementations, the login credentials are provided in the form of: text input, audio input, or visual input. For example, the user of user device 106 can enter their login credentials through a text field, provide a voice sample, perform a gesture, etc.

Process 400 continues with detecting, by the identity server, a trigger event (404). For example, identity server 130 can detect a trigger event, such as a threshold number of accesses to the same website.

In some implementations, the trigger event can be a user input or a predetermined condition defined by the identity server. For example, identity server 130 can detect a user's click on a user interface element through user interface 134 to indicate the user's wish to initiate creating a new virtual email address.

In response to detecting the trigger event process 400 continues with creating, by the identity server, a new virtual email address separate from the first email address and mapped to a second set of user information values different from the first set of user information values (406). For example, identity server 130 can create a new virtual email address separate from the main email address. The new virtual email address is linked to the main email address within identity server 130, but this relationship cannot be determined by a third party, such as a requesting entity, as described above with respect to FIGS. 2-3.

The process 400 continues with detecting, by the identity server and from a requesting entity, a request for credentials (408). For example, the identity server 130 can detect a request for credentials, such as an email address to sign up for updates from a blog.

In some implementations, the request for credentials can be data indicating that the user device has accessed a webpage having one or more text fields for entering credentials. For example, identity server 130 can simply detect that the user device 106 has navigated to a webpage that has one or more text fields or other user interface elements through which credentials such as contact information or a first name can be entered.

In response to detecting the request, the process 400 continues with transmitting, by the identity server, the new virtual email address as login credentials to the requesting entity (410). For example, identity server 130 provides the new virtual email address to a requesting entity, such as a business that owns the website that the user accessed.

In some implementations, transmitting the new virtual email address as login credentials to the requesting entity includes transmitting, through a tokenization application programming interface, data representing the new virtual email address through a tokenization API, and the data representing the new virtual email address is a token that cannot be traced to the first email address. For example, the identity server 130 can transmit the new virtual email address as an identifier to a requesting entity through secure API 120.

The identity server can update, based on the new virtual email address, a database by creating a database entry mapping the new virtual email address to the second set of user information values. For example, identity server 130 can update identity database 140 based on the new virtual email address by creating a database entry that maps the new virtual email address to a set of user information that is made available to requesting entities to which the user provides the new virtual email address as an identifier.

In some implementations, process 400 includes receiving, from the user device, input that indicates a change to the new virtual email address and then updating, by the identity server and based on the input that indicates a change to the new virtual email address, the database entry. For example, identity server 130 can receive input from a user device 106 through user interface 134 indicating that the user wants to delete the new virtual email address, and identity server 130 can delete the entry within identity database 140.

Figure 5:
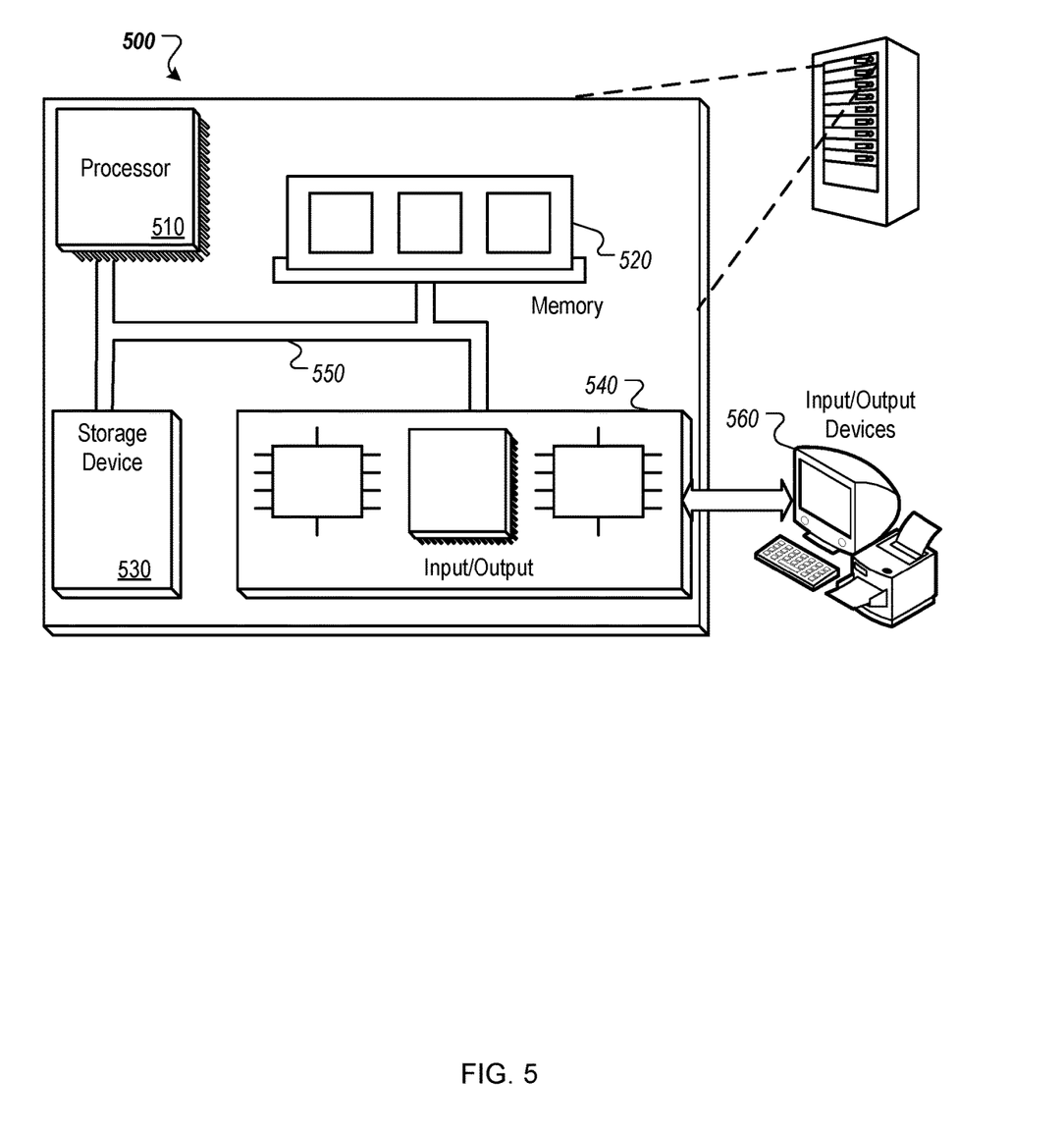
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

In situations in which techniques discussed throughout this document collect and/or use information about a user, the user (such as an end user, content generator, or content provider, among other types of users) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The methods described in this specification may be computer-implemented methods.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The following is a list of non-limiting aspects of the present disclosure:

Aspect 1. A computer-implemented method, comprising:
  receiving, from a user device and at an identity server, login credentials for a first email address mapped to a first set of user information values;
  detecting, by the identity server, a trigger event;
  in response to detecting the trigger event, creating, by the identity server, a new virtual email address separate from the first email address and mapped to a second set of user information values different from the first set of user information values;
    detecting, by the identity server, a request for credentials from a requesting entity; and
    in response to detecting the request, transmitting, by the identity server, the new virtual email address as new login credentials to the requesting entity.

Aspect 2. The method of aspect 1, wherein the trigger event is one of: a user input and a predetermined condition defined by the identity server.

Aspect 3. The method of aspect 1 or aspect 2, wherein the login credentials are provided in the form of: text input, audio input, or visual input.

Aspect 4. The method of any one of aspects 1 to 3, wherein transmitting the new virtual email address as login credentials to the requesting entity comprises:
    transmitting, through a tokenization application programming interface, data representing the new virtual email address through a tokenization API,
    wherein the data representing the new virtual email address is a token that cannot be traced to the first email address.

Aspect 5. The method of any one of aspects 1 to 3, wherein transmitting the new virtual email address as login credentials to the requesting entity comprises:
    transmitting, through a tokenization application programming interface, data representing the new virtual email address through a tokenization API, such that the data representing the new virtual email address is a token that cannot be traced to the first email address.

Aspect 6. The method of any one of aspects 1 to 5, further comprising:
    updating, by the identity server and based on the new virtual email address, a database by creating a database entry mapping the new virtual email address to the second set of user information values.

Aspect 7. The method of aspect 6, further comprising:
    receiving, from the user device, input that indicates a change to the new virtual email address; and
    updating, by the identity server and based on the input that indicates a change to the new virtual email address, the database entry.

Aspect 8. The method of any one of aspects 1 to 7, wherein the request for credentials comprises data indicating that the user device has accessed a webpage having one or more text fields for entering credentials.

Aspect 9. A system comprising:
    one or more processors; and
    one or more memory elements including instructions that, when executed, cause the one or more processors to perform operations including:
        receiving, from a user device and at an identity server, login credentials for a first email address mapped to a first set of user information values;
        detecting, by the identity server, a trigger event;
        in response to detecting the trigger event, creating, by the identity server, a new virtual email address separate from the first email address and mapped to a second set of user information values different from the first set of user information values;
        detecting, by the identity server, a request for credentials from a requesting entity; and
        in response to detecting the request, transmitting, by the identity server, the new virtual email address as new login credentials to the requesting entity.

Aspect 10. The system of aspect 9, wherein the trigger event is one of: a user input and a predetermined condition defined by the identity server.

Aspect 11. The system of aspect 9 or 10, wherein the login credentials are provided in the form of: text input, audio input, or visual input.

Aspect 12. The system of any one of aspects 9 to 11, wherein transmitting the new virtual email address as login credentials to the requesting entity comprises:
    transmitting, through a tokenization application programming interface, data representing the new virtual email address through a tokenization API,
    wherein the data representing the new virtual email address is a token that cannot be traced to the first email address.

Aspect 13. The system of any one of aspects 9 to 11, wherein transmitting the new virtual email address as login credentials to the requesting entity comprises:
    transmitting, through a tokenization application programming interface, data representing the new virtual email address through a tokenization API,
    such that the data representing the new virtual email address is a token that cannot be traced to the first email address.

Aspect 14. The system of any one of aspects 9 to 13, the operations further comprising:
    updating, by the identity server and based on the new virtual email address, a database by creating a database entry mapping the new virtual email address to the second set of user information values.

Aspect 15. The system of aspect 14, the operations further comprising:
    receiving, from the user device, input that indicates a change to the new virtual email address; and
    updating, by the identity server and based on the input that indicates a change to the new virtual email address, the database entry.

Aspect 16. The system of any one of aspects 9 to 15, wherein the request for credentials comprises data indicating that the user device has accessed a webpage having one or more text fields for entering credentials.

Aspect 17. A computer storage medium encoded with instructions that when executed by a distributed computing system cause the distributed computing system to perform operations comprising:
    receiving, from a user device and at an identity server, login credentials for a first email address mapped to a first set of user information values;
    detecting, by the identity server, a trigger event;
    in response to detecting the trigger event, creating, by the identity server, a new virtual email address separate from the first email address and mapped to a second set of user information values different from the first set of user information values;
    detecting, by the identity server, a request for credentials from a requesting entity; and
    in response to detecting the request, transmitting, by the identity server, the new virtual email address as new login credentials to the requesting entity.

Aspect 18. The computer storage medium of aspect 17, wherein the trigger event is one of: a user input and a predetermined condition defined by the identity server.

Aspect 19. The computer storage medium of aspect 17 or 18, wherein the login credentials are provided in the form of: text input, audio input, or visual input.

Aspect 20. The computer storage medium of any one of aspects 17 to 19, wherein transmitting the new virtual email address as login credentials to the requesting entity comprises:
    transmitting, through a tokenization application programming interface, data representing the new virtual email address through a tokenization API,
    wherein the data representing the new virtual email address is a token that cannot be traced to the first email address.

Aspect 21. The computer storage medium of any one of aspects 17 to 19, wherein transmitting the new virtual email address as login credentials to the requesting entity comprises:
    transmitting, through a tokenization application programming interface, data representing the new virtual email address through a tokenization API, such that the data representing the new virtual email address is a token that cannot be traced to the first email address.

Aspect 22. The computer storage medium of any one of aspects 17 to 21, the operations further comprising:
    updating, by the identity server and based on the new virtual email address, a database by creating a database entry mapping the new virtual email address to the second set of user information values.

Aspect 23. The computer storage medium of aspect 22, the operations further comprising:
    receiving, from the user device, input that indicates a change to the new virtual email address; and
    updating, by the identity server and based on the input that indicates a change to the new virtual email address, the database entry.

What is claimed is:

1. A method, comprising:
    receiving, from a user device and at an identity server, login credentials for a first email address mapped to a first set of user information values;
    detecting, by the identity server, a trigger event;
    in response to detecting the trigger event, creating, by the identity server, a new virtual email address separate from the first email address and mapped to a second set of user information values different from the first set of user information values, wherein the new virtual email address has a specified triggering event that initiates deletion of the new virtual email address;
    detecting, by the identity server, a request for credentials from a requesting entity; and
    in response to detecting the request, transmitting, by the identity server and to the requesting entity, (i) the new virtual email address as new login credentials for the requesting entity and (ii) the second set of user information values based on the new virtual email address being used as the new login credentials for the requesting entity.

2. The method of claim 1, wherein the trigger event is one of: a user input and a predetermined condition defined by the identity server.

3. The method of claim 1, wherein the login credentials are provided in the form of: text input, audio input, or visual input.

4. The method of claim 1, wherein transmitting the new virtual email address as login credentials to the requesting entity comprises:
    transmitting, through a tokenization application programming interface, data representing the new virtual email address through a tokenization application programming interface (API),
    wherein the data representing the new virtual email address is a token that cannot be traced to the first email address.

5. The method of claim 1, further comprising:
    updating, by the identity server and based on the new virtual email address, a database by creating a database entry mapping the new virtual email address to the second set of user information values.

6. The method of claim 5, further comprising:
    receiving, from the user device, input that indicates a change to the new virtual email address; and
    updating, by the identity server and based on the input that indicates a change to the new virtual email address, the database entry.

7. The method of claim 1, wherein the request for credentials comprises data indicating that the user device has accessed a webpage having one or more text fields for entering credentials.

8. The method of claim 1, wherein the specified triggering event comprises a specified time period following creation of the new virtual email address.

9. The method of claim 1, wherein the trigger event comprises user navigation to a particular website during a browsing session and the specified triggering event comprises an end of the browsing session.

10. The method of claim 1, wherein creating the new virtual email address comprises: obtaining one or more parameters from the user device; and generating the new virtual email address using the one or more parameters.

11. The method of claim 1, further comprising determining the trigger event for a user of the user device based on online activity of the user.

12. The method of claim 1, further comprising:
    in response to detecting the request for credentials from the requesting entity, initiating display, at the user device, of a user interface that shows a set of virtual email addresses for a user of the user device; and
    receiving data indicating selection of the new virtual email address by the user at the user device,
    wherein the new virtual email address is transmitted to the requesting entity based on the selection of the new virtual email address by the user of the user device.

13. A system comprising:
    one or more processors; and
    one or more memory elements including instructions that, when executed, cause the one or more processors to perform operations including:
        receiving, from a user device and at an identity server, login credentials for a first email address mapped to a first set of user information values;
        detecting, by the identity server, a trigger event;
        in response to detecting the trigger event, creating, by the identity server, a new virtual email address separate from the first email address and mapped to a second set of user information values different from the first set of user information values, wherein the new virtual email address has a specified triggering event that initiates deletion of the new virtual email address;
        detecting, by the identity server, a request for credentials from a requesting entity; and
        in response to detecting the request, transmitting, by the identity server and to the requesting entity, (i) the new virtual email address as new login credentials for the requesting entity and (ii) the second set of user information values based on the new virtual email address being used as the new login credentials for the requesting entity.

14. The system of claim 13, wherein the trigger event is one of: a user input and a predetermined condition defined by the identity server.

15. The system of claim 13, wherein the login credentials are provided in the form of: text input, audio input, or visual input.

16. The system of claim 13, wherein transmitting the new virtual email address as login credentials to the requesting entity comprises:
   transmitting, through a tokenization application programming interface, data representing the new virtual email address through a tokenization application programming interface (API),
   wherein the data representing the new virtual email address is a token that cannot be traced to the first email address.

17. The system of claim 13, the operations further comprising:
   updating, by the identity server and based on the new virtual email address, a database by creating a database entry mapping the new virtual email address to the second set of user information values.

18. The system of claim 17, the operations further comprising:
   receiving, from the user device, input that indicates a change to the new virtual email address; and
   updating, by the identity server and based on the input that indicates a change to the new virtual email address, the database entry.

19. The system of claim 13, wherein the request for credentials comprises data indicating that the user device has accessed a webpage having one or more text fields for entering credentials.

20. A non-transitory computer storage medium encoded with instructions that when executed by a distributed computing system cause the distributed computing system to perform operations comprising:
   receiving, from a user device and at an identity server, login credentials for a first email address mapped to a first set of user information values;
   detecting, by the identity server, a trigger event;
   in response to detecting the trigger event, creating, by the identity server, a new virtual email address separate from the first email address and mapped to a second set of user information values different from the first set of user information values, wherein the new virtual email address has a specified triggering event that initiates deletion of the new virtual email address;
   detecting, by the identity server, a request for credentials from a requesting entity; and
   in response to detecting the request, transmitting, by the identity server and to the requesting entity, (i) the new virtual email address as new login credentials for the requesting entity and (ii) the second set of user information values based on the new virtual email address being used as the new login credentials for the requesting entity.

\* \* \* \* \*